INVENTOR.
Arnold H. Hoffer,
BY John H. Leonard,
his ATTORNEY.

Jan. 5, 1960  A. H. HOFFER  2,919,928
HEAVY DUTY TRAILER WITH BOGEY ASSEMBLY HAVING CASTER WHEELS
Filed Oct. 7, 1957  4 Sheets-Sheet 3

INVENTOR.
Arnold H. Hoffer,
BY John H. Leonard,
his ATTORNEY.

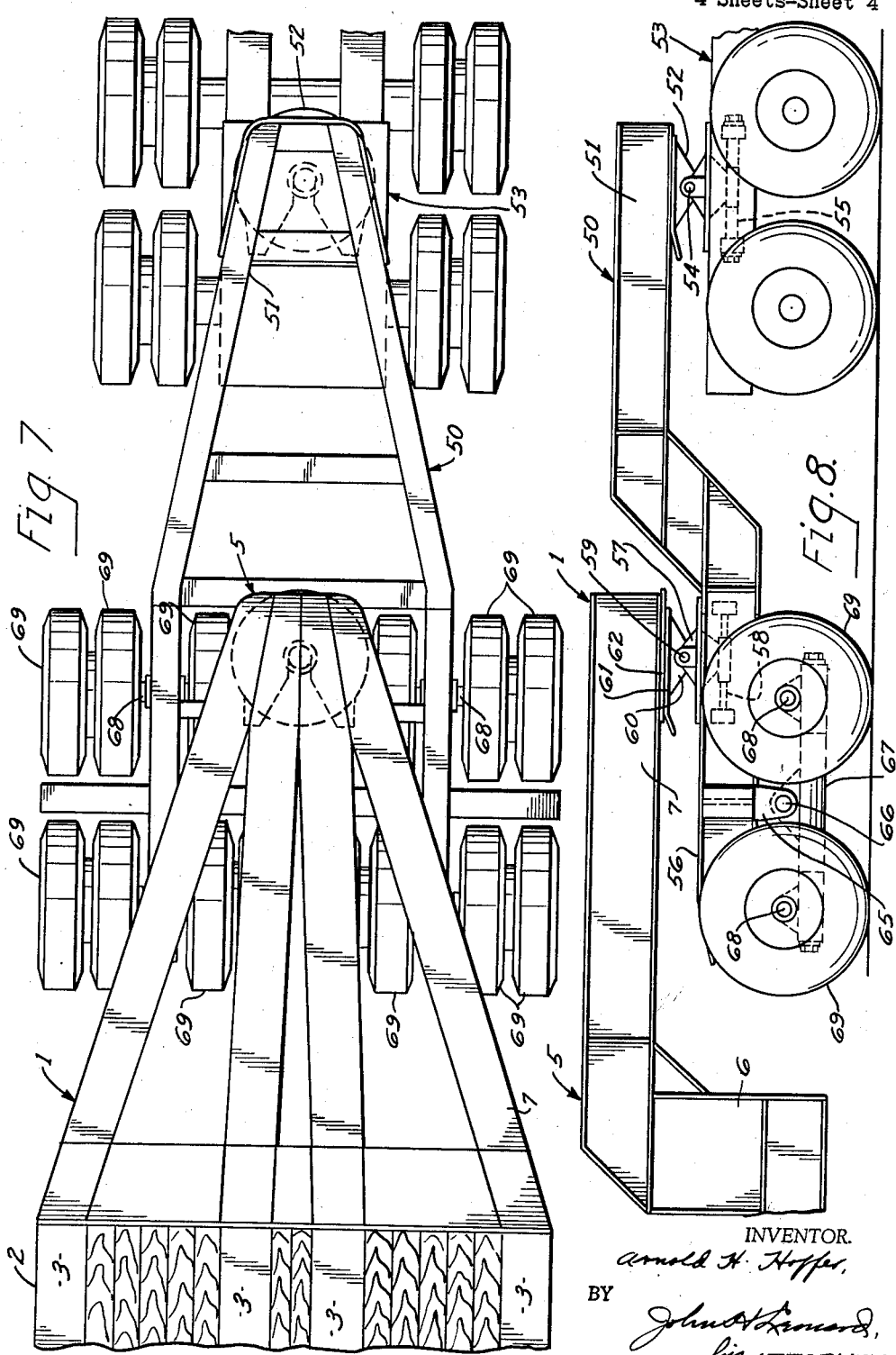

United States Patent Office 2,919,928
Patented Jan. 5, 1960

2,919,928
HEAVY DUTY TRAILER WITH BOGEY ASSEMBLY HAVING CASTER WHEELS

Arnold H. Hoffer, Erie, Pa., assignor to Rogers Brothers Corporation, Albion, Pa., a corporation of Pennsylvania Application October 7, 1957, Serial No. 688,475

9 Claims. (Cl. 280—81)

This invention relates to heavy duty trailers, and particularly to a heavy duty trailer which is arranged to distribute the load uniformly over a multiplicity of wheels, to distribute the load laterally so as to reduce the stresses to which the trailer is subjected, and to provide for the ready convertibility of the number of sets of wheels for carrying different sizes of loads.

Principal objects of the invention are to provide a trailer in which the main frame is supported on substantially a three-point suspension and so arranged that the load is distributed uniformly to the wheels, and which is exceedingly stable and free from twist; and to provide a new rear assembly made up of two completely independent units, each providing a single axle support between it and the body and each arranged with three wheel-axles in tandem, the wheel-axles being arranged for rocking as a group about an axis extending transversely of the trailer so as to equalize the load in the direction forwardly and rearwardly of the trailer relative to the wheels and for rocking individually independently of each other about axes extending longitudinally of the trailer, so as to accommodate their wheels to irregularities transversely of the highway.

A more specific object is to provide a heavy duty trailer having rear wheel assemblies each of which provides two wheel-axles, arranged in tandem, which are rockable about a transverse axis and also about an axis extending longitudinally of the trailer, and with which there is combined a self-steering wheel caster assembly which is arranged to turn freely as a whole about an upright axis offset forwardly of the trailer from its wheel axis, so as to not interfere with the normal turning and steering of the trailer itself.

Another object is to provide a trailer of this character in which the caster assembly can readily be detached for conversion of the wheel-assembly from a three-axle unit to a two-axle unit.

Another object is to provide a trailer of this character in which a dolly is provided for supporting the front end, and has an assembly of wheeled axles identical with the two wheeled-axle assemblies used in the rear wheel assemblies and readily interchangeable therewith.

Other objects and advantages will become apparent from the following description wherein reference is made to the drawings in which:

Fig. 6 is a cross sectional view of the body of the trailer, showing the main beams and decking;

Figs. 7 and 8 are, respectively, a fragmentary top plan view and a fragmentary side elevation of the front portion of the trailer, showing also its association with the tractor.

Figures 1, 2:
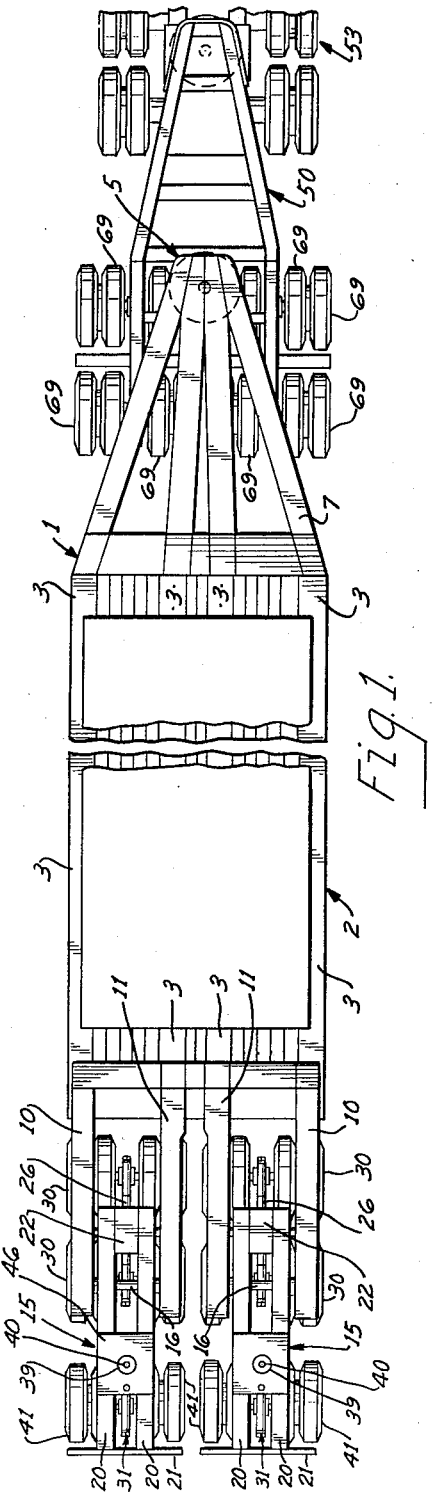
Figs. 1 and 2 are a top plan view and side elevation, respectively, of a trailer embodying the principles of the present invention, a portion of a tractor or truck connected thereto being shown in Fig. 2 for clearness in illustration.
Figure 3:
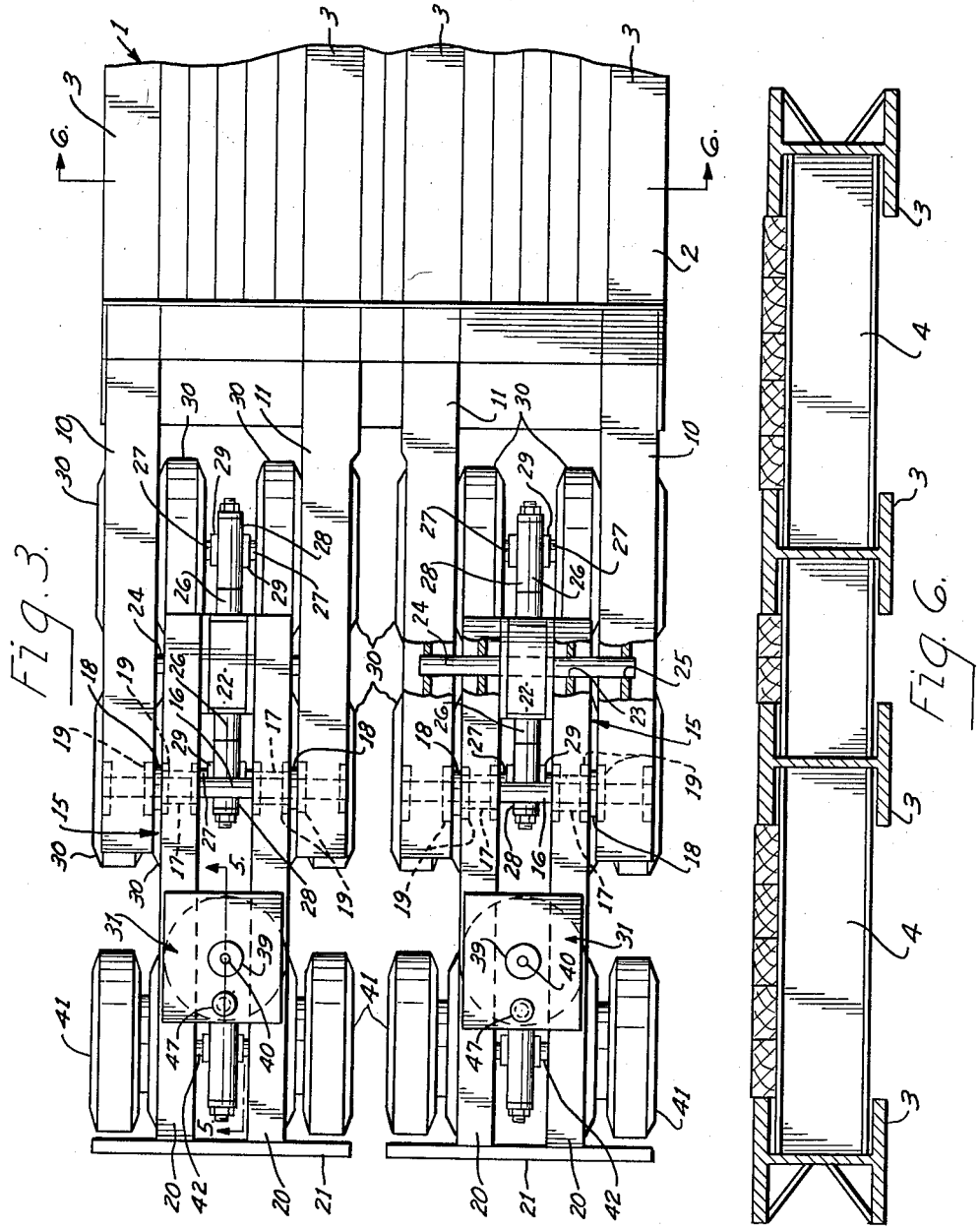
Figs. 3 and 4 are, respectively, an enlarged, fragmentary, top plan view and an enlarged, fragmentary side elevation of the rear portion of the trailer, showing the rear wheel assemblies, part of the trailer being broken away for clearness in illustration.

Referring to the drawings, the trailer, indicated generally at 1, comprises a bed 2 formed of main longitudinal sills 3 and cross-tie beams 4, suitable decking, as indicated, being provided.

In the form illustrated, four longitudinal sills are used, these sills being arranged in sets each of which comprises one outboard sill and one adjacent inboard sill. The sets are positioned symmetrically at opposite sides of the longitudinal center line of the bed. The front end of the trailer bed is provided with a conventional gooseneck hitch, indicated generally at 5, and comprising an upright portion 6 and a forwardly extending portion 7. The trailer bed is of the drop-deck type and, accordingly, the rear portion is in the form of a raised rear platform portion 8 and upright connecting portion 9. The platform portion 8 also is composed of sills and cross tie members, the sills being in the form of I-beams and arranged in sets, each of which comprises one outboard sill 10 and one inboard sill 11, the sets being located symmetrically on opposite sides of the longitudinal center line of the bed.

Two rear wheel assemblies are provided and, since they are identical, one only is herein described in detail. The assemblies are connected one assembly to each outboard beam 10 and its associated inboard beam 11. Each assemblage is shown as comprising a main rocking beam 15 which is mounted on a shaft 16, for rocking movement about an axis extending transversely of the trailer bed. The specific mounting of the beam on the sills 10 and 11 may take any conventional form, but preferably the shaft 16 is secured at its ends to its associated set of sills 10 and 11, and passes through suitable bushings 17 in the rocking beam. Spacing or bearing washers 18 may be provided, if desired, between the lateral limits of the rocking beam 15 and suitable plates 19 carried by sills 10 and 11 so as to hold the rocking beam in proper position axially of the shaft 16.

Figure 4:
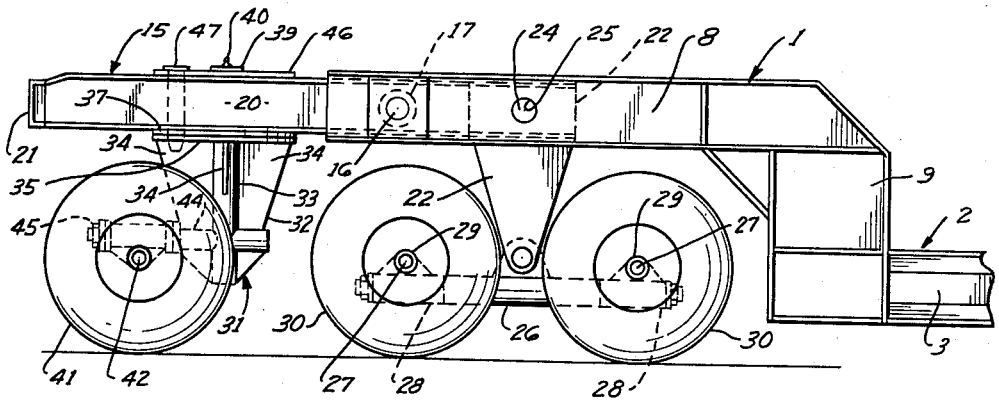

Each beam 15 comprises a rigid structure which, in the form illustrated, is composed of two I-beams 20 spaced apart from each other axially of the shaft 16 and secured together at one end by a suitable plate 21 and at the other end by a boxlike bracket 22. The bracket 22 is disposed with its box section between the I-beams 20 and is permanently bonded thereto in fixed position. The beam 15 and the bracket 22 have aligned passages 23 therethrough which accommodate a suitable lock shaft 24. The webs of the sills 10 and 11 have passages 25 with which the passages 23 become aligned when the beam 15 is horizontal, so that the shaft 24 can be passed axially through all of the passages and anchor the rocking beam 15 against any rocking movement in its horizontal position illustrated in Fig. 4. The shaft and associated openings thereby act as a latch to latch the rocking beam in a predetermined rocked position when desired.

Mounted on the lower end of the bracket 22 for rocking movement transversely of the bed of the trailer about an axis extending parallel to the shaft 16, is a rigid axle support 26. Mounted on the forward and rearward ends of the support 26, in tandem with each other, are wheel-axles 27 which are connected to the support 26 for rocking independently of each other about an axis extending longitudinally of the support 26. The support 26 may be in the form of a rigid beam having trunnions at the end on which are rockably mounted sleeves 28 which carry housings 29 in which the axles 27 are securely fastened in fixed position. Thus, the support 26 can rock about an axis extending transversely of the bed and the axles 27, in turn, can rock about an axis extending longitudinally of the support and bed. Suitable wheels 30 are carried on the axles 27. In the form illustrated, two dual wheels are employed on each axle 27, one dual wheel at each side of the longitudinal axis of the support 26.

The main rocking beams 15 extend rearwardly, longitudinally of the bed, beyond the ends of the sills 10 and 11 to which they are connected. The wheels 30 are positioned so that their individual axes are spaced, endwise of the body, inwardly from the rear ends of the sills 10 and 11. Mounted on the rearwardly protruding end of each beam 15 is a caster, indicated generally at 31.

Figure 5:
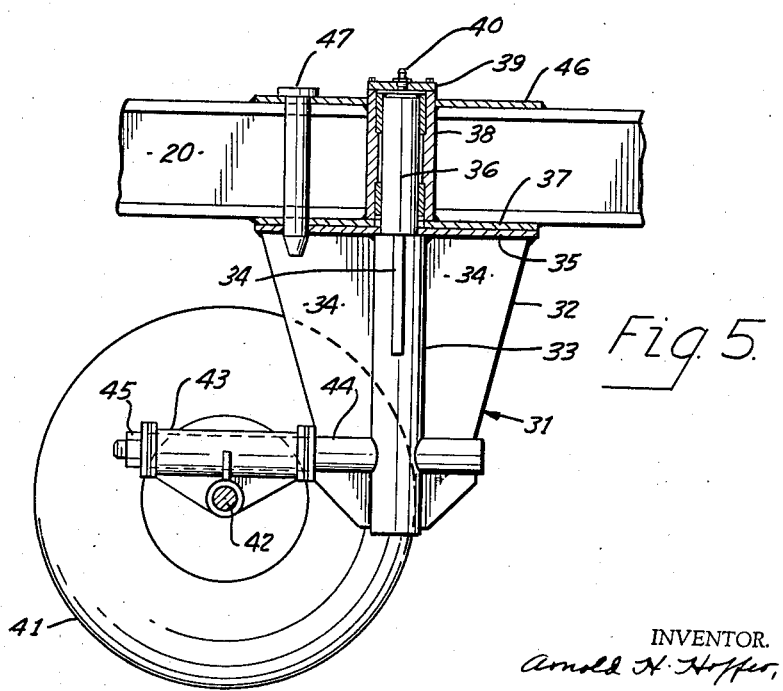
Fig. 5 is an enlarged, vertical, sectional view taken on the line 5—5 in Fig. 3.

As best illustrated in Fig. 5, each caster comprises a caster wheel support 32 which is in the form of an upright heavy rod 33 reinforced by suitable radial gussets 34. Mounted on the upper end of the support 32 is a means for connecting the support 32 in supporting relation to the bed of the trailer. This is accomplished by connecting the support to the main rocking beam 15. The connection between the support 32 and the beam 15 is in the form of a fifth wheel connection by virtue of which the weight supporting bed and support are relatively rotatable about an upright axis. At the upper end of the support 32 are bearing means including a fifth-wheel plate 35 and an upright king pin 36. Mounted on the trailer bed through the medium of the rocking beam 15 is a complementary fifth-wheel bearing plate 37 and a socket in the form of a sleeve 38 which is complementary to the king pin 36 so as to accommodate it in coaxial relation thereto for rotation about the common upright axis. The plates 35 and 37, pin 36, and sleeve 38 are so arranged that the pin 36 fits into the sleeve snugly and rotatably while the plates 35 and 37 are in bearing contact with each other.

Heretofore, considerable difficulty has been encountered in maintaining lubrication in such fifth wheel structure and, for this purpose, the sleeve 38 is sealed at the top by a suitable cap 39 and is provided with the conventional pressure lubricating injection nozzle 40 by which lubricant can be forced into the upper end of the sleeve by the usual gasoline service station pressure lubricating systems. The juncture between the pin 36 and the bearing surface of the plate 35 is sealed. Also, the juncture between the open or lower end of the sleeve 38 and the bearing surface of the plate 37 is sealed. Accordingly, any grease or lubricant forced through the fitting 40 is constrained to pass around and lubricate the entire length of the pin 36 and the cooperating wall of the sleeve 38, and then to pass down through the open lower end of the sleeve and outwardly between the bearing surfaces of the plates 35 and 37. The surfaces of these plates are sufficiently large relative to the size of the trailer and the weight which it is to carry so that the unit bearing pressure between the plates does not press them together tightly enough to prevent pressure fed lubricant when supplied under the usual pressure provided in gasoline station forced lubricating systems through the fitting 40, from passing outwardly between the plates 35 and 37. If desired, however, instead of the sleeve 38 fitting the pin 36 and providing the bearing, or being bushed with a suitable bronze bushing, it may be provided with anti-friction bearings for mounting the pin, such bearings being of the type which ordinarily take both thrust and radial stress, in which case, the large plates, such as the plates 35 and 37, may be omitted.

On the lower end of the support 32 is a caster wheel support which, in the form illustrated, comprises a pair of dual wheels 41 mounted on an axle 42 which is secured in a housing 43, the housing 43, in turn, being rockably mounted on a shaft 44 which is rigid with the support 32 and extends therefrom at ninety degrees to the axis of the pin 36.

The axis of the axle 42 is preferably offset rearwardly of the bed from the axis of the pin 36 so that all frictional drag and forces imposed on the peripheries of the wheels 41 by the roadway, as the wheels are drawn along the roadway, tend to swing the wheels 41 about the upright axis of the pin 36 so that they are self steering and follow the proper path of the bed as the bed is being moved along a lineal or curvilinear path.

It is noted that the plates 35 and 37, and the pin 36 and sleeve 38, are freely separable by movement of the support 32 downwardly, axially of the pin 36, away from the beam 15. Thus, the support is held in position axially of the pin by virtue of the weight of the body and the reactive force on the wheels 41 and can readily drop out of its mounting when the wheels 41 are removed. In order to render the support readily detachable, the housing 43 is secured onto the shaft 44 by means of a readily removable retaining nut 45 which, when removed, permits the entire housing 43, with the wheels assembled thereon, to be slid off of the shaft 44 in a direction angularly disposed to the axis of the pin 36. When the caster wheels 41 and housing 43 are thus removed, then the support 32 can drop by gravity to a position such that the pin 36 is entirely removed to a point below the lower open end of the sleeve 38. Before removal of the caster wheels 41 in this manner, the beam 15 is locked by means of the shaft 24.

In some instances, it happens that the operator of the tractor does not desire to have the beam 15 extending rearwardly beyond the rear of the sills 10 and 11 when the caster is not in use. In such instances, the entire rocking beam assembly, together with the front and rear tandem rocking axles and wheels and the caster wheels, may be removed as a single unit by removal of the shaft 16. There can then be substituted therefor and locked in place by the shafts 16 and 24, a single non-rocking beam which is provided with a bracket similar to the bracket 22 and which terminates at the rear ends of the sills 10 and 11.

Ordinarily, the caster wheels are allowed to swing and be self-steering. However, in backing, it is necessary that they be locked so that the caster assembly cannot rotate about the axis of the pin 36. For this purpose, suitable apertures are provided in mounting plates 46 on the beam 15 and in the plates 35 and 37. These apertures are adapted to be aligned when the caster wheels are in their most rearward position in which their axle extends directly across the trailer body. A suitable pin 47 is passed through the aligned openings for latching the support 32 against rotation about the upright axis of the pin 36.

In general, it is desirable to balance the load so that it is distributed equally between the front and rear tandem wheels 30 of the rear wheel assemblage and the caster wheel 31 so that each one of the sets of wheels receives the same amount of load. For this purpose, the rocking beam 15 also acts as an equalizing beam. This is accomplished by placing its rocking axis, which is the axis of the shaft 16, twice as far from the axle of the caster wheel 41 as it is from the rocking axis at the bottom of the support 26. Thus the support 26 for the tandem wheels 30 receives two thirds of the half-load applied by the rear end of the trailer bed to each shaft 16 and the caster wheels receive one third of the half-load. Each caster has a pair of dual wheels, and each of the tandem axles 27 has a pair of dual wheels. Thus, there are six dual wheels for each half of the bed, and each dual wheel receives one sixth of the load applied to its associated shaft 16. Since two duplicate rear wheel assemblies are used and they are arranged symmetrically at opposite sides of the longitudinal center line of the trailer bed, each assembly likewise carries one half of the total load applied by the rear end of the trailer bed to the shafts 16. Thus, each of all of the dual wheels at the rear end of the bed carries the same amount of load.

If a caster is removed, and the beam 15 is locked by the shaft 24, then the tandem wheels on the bracket 22 distribute the load uniformly among themselves. Thus, the rear end of the trailer body is supported essentially at two points, one at one rear wheel assembly and at the other rear wheel assembly. Since the rear wheels can rock about longitudinal axes, there is no substantial twist introduced into the frame by the rear wheel assemblies themselves. However, a twist ordinarily would be introduced due to a road contour which necessitates that the rear wheel assemblies, as a whole, be at different elevations. Such twisting forces ordinarily would impose severe twisting stresses in the trailer bed. However, this is eliminated by the mounting of the front end of the bed.

As best illustrated in Figs. 7 and 8, there is provided for the front end of the body a wheeled dolly 50 having the usual detachable gooseneck hitch 51 adapted for connection to a fifth wheel member 52 carried on the rear of a tractor 53. The member 52 is mounted for rocking about a transverse axis 54 and preferably also about a longitudinal axis 55, all in a well-known manner. A lower or rearward portion 56 of the dolly 50 is provided with the fifth-wheel bracket 57 which is mounted for rocking movement about a longitudinal shaft 58. The bracket 57 carries a transverse rock shaft 59 to which is connected the fifth wheel member 60 having an upwardly exposed bearing plate 61. The front end of the gooseneck of the trailer bed is provided with complementary bearing plate 62 with a depending king pin, not shown, which is rotatably received in a coaxial socket in the fifth wheel member 60, all in a well-known manner of the usual combined side oscillating and forward and rearward rocking fifth wheels. Thus, since the fifth wheel connection between the dolly and the forward end of the trailer can rock about both a longitudinal axis and a transverse axis, no twisting stresses are imposed. Instead, the result is essentially a single point support for the front end of the trailer bed. In order to distribute among the dolly wheels the load imposed by the front of the trailer bed through the fifth wheel 60 to the dolly, the dolly is provided with depending brackets 65 which carry transverse shafts 66 on which are mounted longitudinally extending rocking beams 67, respectively, each of which is rockable about the axis of its transverse shaft 66. Mounted on the ends of rocking beam 67 are axles 68 which are rockable about the longitudinal axis of the associated beam 67. Each axle 68 is provided with two dual wheels, making four dual wheels on the dolly at each side of the center line of the trailer bed. The axis of each shaft 66 is positioned relative to the axis 54 of the tractor fifth wheel so that the total load applied on the dolly by the front end of the trailer bed, compensated for the additional weight of the relatively heavy dolly itself and the weight of the trailer body, is balanced two thirds on the dolly wheels and one third on the rear of the tractor. Thus, all wheels, when the tandem and caster wheels both are used at the rear and the dolly is used at the front, carry an equal amount of load. The dolly rocking beam 67, axles 68, and wheels 69 carried thereby are identical with the rocking beam 26, axles 27, and wheels 30 carried thereby so that the dolly wheels and beam can readily be interchanged for the rear tandem wheels and beam, if desired.

Having thus described my invention, I claim:

1. A trailer including a bed, a rear wheel assembly for the bed including a rocking beam member, means securing the rocking beam member between its ends to the bed for rocking about an axis extending transversely of the bed, an axle support secured to the rocking beam member forwardly of the rocking beam member rocking axis for rocking about an axis parallel to said rocking beam member rocking axis, axles mounted on the axle support at opposite sides of the axle support rocking axis for rocking independently of each other about an axis extending endwise of the axle support, wheels on said axles, respectively, a wheeled caster including a caster wheel support member, a caster wheel axle, a first connecting means detachably connecting the caster wheel axle to the caster wheel support member, caster wheel means on said caster wheel axle, additional means detachably connecting the caster wheel support member to the rocking beam member rearwardly of the rocking beam member rocking axis for removal from the rocking beam member while the trailer bed remains supported by said wheels at its normal operating position and for rotation of the caster wheel support member about a generally upright axis, and said additional means also rendering the caster wheel means self-dirigible by the frictional drag of the caster wheel means on a roadway in the forward direction of travel of the trailer.

2. The structure according to claim 1 wherein the axis of said caster wheel axle is offset endwise of the rocking beam member from the upright axis of the caster wheel support member.

3. The structure according to claim 1 additionally including locking means to lock the caster wheel support member against rotation about said upright axis, with the axis of the caster wheel axle in a plane parallel to the rocking axis of the rocking beam member and said upright axis.

4. The structure according to claim 1 wherein said first connecting means detachably connects the caster wheel axle to the caster wheel support member for removal of the caster wheel axle from the support member in a direction transversely of said upright axis while the trailer bed remains in said normal operating position.

5. A structure according to claim 4 wherein said additional means comprises a sleeve bearing carried by the rocking beam member with its axis vertical, a complementary pin bearing on the caster wheel support member receivable axially in the sleeve bearing from the lower end of the sleeve bearing, said pin bearing extending above the axle of the caster wheel means a distance such that with the caster wheel means removed the caster wheel support member may be lowered sufficiently to disengage the pin bearing from the sleeve bearing.

6. The structure according to claim 1 and additionally including a connecting pin on said caster wheel support member, a thrust resisting means on said caster wheel support member for resisting thrusts axially of the pin toward the rocking beam member, coacting means on the rocking beam member cooperable with the pin and thrust resisting means to rotatably support the pin for rotation about an upright axis and to limit the axial movement of the pin in the direction of movement of the members toward each other, said connecting pin being arranged for free and unrestrained detachment from said coacting means upon relative movement axially of the pin in a direction away from said coacting means.

7. A structure according to claim 1 wherein latch means are provided for latching the beam member in a predetermined rocked position when the wheeled caster is detached from the beam member.

8. A structure according to claim 1 wherein the means connecting the rocking beam member and the trailer bed is a detachable shaft so that the beam member may be readily removed from the trailer bed.

9. A trailer including a body having a pair of longitudinal sills, a wheel unit for the body and including a rocking beam connected to the sills near one end of the sills for rocking about a transverse axis with one end of the rocking beam extending beyond said one end of the sills, tandem wheels at the other end of the rocking beam and positioned so that their axes are inwardly endwise of the body from the adjacent ends of the sills, a self-dirigible wheeled caster having a substantially vertical swivel pin, means operably connecting the swivel pin to said one end of the rocking beam for swiveling movement about a generally upright axis, said wheeled caster being disposed beyond said one end of the sills, and lock means for locking said wheeled caster in a predetermined swivel position whereby the caster is prevented from swiveling about said upright axis.

References Cited in the file of this patent

UNITED STATES PATENTS

| | | |
|---|---|---|
| 1,762,915 | Davis | June 10, 1930 |
| 2,038,265 | Bradley | Apr. 21, 1936 |
| 2,116,412 | Reid | May 3, 1938 |
| 2,359,299 | Brown | Oct. 3, 1944 |
| 2,433,268 | Fellabaum | Dec. 23, 1947 |
| 2,446,205 | Wickersham et al. | Aug. 3, 1948 |
| 2,631,863 | Tranter et al. | Mar. 17, 1953 |
| 2,644,697 | Peterson | July 7, 1953 |
| 2,772,892 | Hake et al. | Dec. 4, 1956 |